US007389749B1

(12) United States Patent
Choate (10) Patent No.: US 7,389,749 B1
(45) Date of Patent: Jun. 24, 2008

(54) STABILIZER FOR SHOEING A HORSE (76) Inventor: Tim H. Choate, Route 3 Box 597C, Albany, KY (US) 42602

( * ) Notice: Subject to any disclaimer, the term of this patent is extended or adjusted under 35 U.S.C. 154(b) by 233 days.

(21) Appl. No.: 11/439,110

(22) Filed: May 23, 2006

(51) Int. Cl.
 *A01L 13/00* (2006.01)
(52) U.S. Cl. .................. 119/726; 119/727; 119/755
(58) Field of Classification Search ............. 119/726, 119/725, 727, 728, 753, 755, 756, 769, 771; 168/44; 5/621, 81.1 R, 83.1, 86.1
 See application file for complete search history.

(56) References Cited

U.S. PATENT DOCUMENTS

| 123,231 | A | * | 1/1872 | Brusoe | 119/726 |
| 740,019 | A | * | 9/1903 | Hutton, Jr. | 119/726 |
| 866,003 | A | * | 9/1907 | Davis | 119/726 |
| 877,947 | A | | 2/1908 | Pendleton | |
| 878,347 | A | * | 2/1908 | Clement | 119/726 |
| 1,375,189 | A | * | 4/1921 | Tucker | 119/726 |
| 1,394,783 | A | * | 10/1921 | Olinger | 119/726 |
| 2,278,298 | A | * | 3/1942 | Young | 119/726 |
| 2,718,214 | A | | 9/1955 | Walker | |
| 3,621,819 | A | * | 11/1971 | Hooper | 119/727 |
| 3,807,361 | A | | 4/1974 | Kaplan | |
| 4,375,203 | A | * | 3/1983 | Parkes | 119/727 |
| 4,428,326 | A | * | 1/1984 | Dubovick et al. | 119/727 |
| 4,829,937 | A | * | 5/1989 | Weelink | 119/727 |
| 5,289,801 | A | * | 3/1994 | Burks | 119/728 |
| 5,669,332 | A | | 9/1997 | Riley | |
| 5,842,443 | A | | 12/1998 | Steinfort | |
| 6,230,662 | B1 | | 5/2001 | Miale et al. | |
| 6,463,886 | B1 | * | 10/2002 | Rodden et al. | 119/728 |
| 6,820,572 | B1 | * | 11/2004 | Parkes | 119/727 |
| 7,195,076 | B2 | * | 3/2007 | De Vor | 168/48.1 |
| 7,228,576 | B2 | * | 6/2007 | Inman et al. | 5/109 |

FOREIGN PATENT DOCUMENTS

GB 2252543 A * 8/1992

* cited by examiner

*Primary Examiner*—Yvonne R. Abbott (57) ABSTRACT

The stabilizer for shoeing a horse is trailer-style apparatus for securely holding horses for close work such as shoeing operations or veterinary procedures. The unit consists of an open-back rectangular perimeter frame with a trailer hitch assembly and an outboard-mounted wheel assembly on each side. The support frame consists of a vertical support in each corner connected by an upper and lower horizontal support on the front, right and left sides and an upper support on the rear side. Mounted in the center of the right and left sides are adjustable retainer bars which slide horizontally inward to restrain the sides of the horse. Elongated spines with retention notches are mounted upon the retainer bars and allow the handler to attach a number of chains for further restraint purposes. An underbelly harness, a back restraint strap, and a neck restraint strap are also connected to the spines and restraint bars. A removable hoof positioner can be attached to either the lower left or right horizontal support, allowing the handler to slide the positioner to the desired location for the task at hand.

20 Claims, 6 Drawing Sheets

STABILIZER FOR SHOEING A HORSE

BACKGROUND OF THE INVENTION

1. Field of the Invention

The present invention relates to a restraining apparatus for use in connection with horses. The stabilizer for shoeing a horse has particular utility in connection with securely holding horses for shoeing operations or veterinary procedures.

2. Description of the Prior Art

Close-in work with horses, such as shoeing and veterinary procedures, have long been necessary, yet dangerous, tasks. At any moment during the shoeing process, the horse can kick, bite, or otherwise injure the individual attempting to place the shoe on its hoof. Additionally, if the shoeing is being carried out in a stable, the horse can use its weight to pin the shoer against the stable wall. Beyond the danger of the horse injuring the individual, the process of shoeing can be tedious since the hoof of the horse must be stabilized to effectively complete the task. Therefore, a device which would restrict the horse from injuring the individual attending to it while allowing free access to the horse and providing hoof support would not only increase the safety of the individual working with the horse but also reduce the time and the effort necessary to perform tasks related to the horse's hooves. In addition, the ability for such a device to be portable via a trailer hitch setup would allow the horse owner to safely administer any close attention his horses might need at any desired location, which could be extremely useful if the horses are transported to various events.

The use of specialty horse stabilizers is known in the prior art. For example, U.S. Pat. No. 877,947 to Lewis Pendleton discloses a horseshoeing stall that consists of a supporting frame, rollers supporting adjustable straps for restraining the horse, a breeching strap, a windlass, hopples, and foot rests for the horse's hooves. However, the Pendleton '947 patent fails to provide for the mobility of the device since it has neither a trailer hitch nor wheels for easy movement. In addition, the supporting frame of the Pendleton '947 device is not adjustable according to the girth of the animal. Although the restraining straps can be adjusted to hold the animal, a smaller animal will be harder to reach through the sides of the frame than will be a larger animal. Finally, the foot rests of the Pendleton '947 device are not moveable, forcing the horse handler to correctly position the horse according to the foot rest position instead of positioning the foot rest according to the horse's position.

U.S. Pat. No. 3,807,361 to Norman C. Kaplan discloses an animal elevating means that includes a collapsible open-walled frame stall with a means for independently elevating either the front or rear of the animal and a harness structure for supporting the animal when it is lifted. However, while the Kaplan '361 patent discusses portability as a consideration, it does not provide wheels for easy mobility of the device, nor does it provide a trailer hitch for easy hookup to a motor vehicle. Moreover, the Kaplan '361 device makes no provision for a foot holder upon which the horse's hoof can be stabilized for work to be completed thereupon.

Similarly, U.S. Pat. No. 2,718,214 to Robert E. Walker discloses a hoof-trimming stall that includes a platform, a framework extending upward from the platform, a hammock, right and left lateral supports for the hammock, means for simultaneously raising and lowering the supports, and means for positioning and retaining any selected leg of an animal within the stall. However, the Walker '214 patent fails to provide mobility considerations for the stall in question. In addition, the hoof positioners of Walker '214 device are inclined boards with holes into which a looped rope can be inserted for through passage of the animal's hoof and subsequent tightening thereof. Since the rope, or other means for securing the hooves is not a permanent part of the Walker '214 device, it could easily be lost or misplaced, rendering it unavailable at the necessary time. Moreover, the procedure of looping the rope, inserting it through the opening, and securing the animal's hoof could be a tedious procedure, especially if often repeated.

U.S. Pat. No. 5,669,332 to William S. Riley discloses a portable chute for immobilizing an animal that has a front gate, a rear gate, and a stanchion for immobilizing the animal, all of which are operable from a single location at the rear of the chute. The chute is pivotably mounted onto the bed of a vehicle and is rotatable between a horizontal position on the bed of the vehicle and a vertical animal-loading position. However, the Riley '332 patent requires the use of a pickup truck, which could cause added expense for the owner. Furthermore, the use of the bed of the pickup truck by the Riley '332 patent can lead to animal excrement in the truck bed, thereby leaving the owner an undesirable clean up job. Finally, the Riley '332 patent fails to provide a means by which the animal's hooves can be restrained for the further safety of the animal caregiver.

Likewise, U.S. Pat. No. 6,230,662 B1 to Theresa Miale, Gloria Miale, David Giuntoli, and Tom Bailey discloses an animal lift and transport apparatus having a collapsible gurney style structure with wheels, a guide handle, restraining straps, and multiple handholds for carrying purposes. However, use of the Miale, et al. '662 B1 device is limited to immobile animals, providing a minimal amount of restraint for the animal in question; therefore it would not be helpful when attempting to shoe a horse or when working on a healthy animal's hooves. Additionally, use of the Miale, et al. '662 B1 device requires multiple individuals to move the animal onto the support sheet. Finally, no provision is made in the Miale, et al. '662 B1 patent for securing an animal's hooves for individual work required thereon.

Lastly, U.S. Pat. No. 5,842,443 to John James Steinfort discloses an animal lifting apparatus that comprises a harness and support suspended from a frame gambrel that is connected to a weight lifting device. However, the Steinfort '443 device requires the use of some sort of lifting device which might not be available to all users and in all locations. Furthermore, the Steinfort '443 device would be more useful for working on a docile animal since the animal must be positioned in a particular fashion in order to fasten the harness and support correctly; therefore, it would be better suited for working on cows rather than feistier quadrupeds such as horses. Finally, the Steinfort '443 patent makes no provision for individually securing and supporting an animal's hooves for required work in that area.

While the above-described devices fulfill their respective, particular objectives and requirements, the aforementioned patents do not describe a mobile stabilizer for shoeing a horse that securely holds horses for shoeing operations or veterinary procedures and affords the maximum safety for the animal caretaker while providing maximum accessibility to the animal upon which the work is being performed. The Pendleton '947, Kaplan '361, and Walker '214 patents fail to provide for the mobility of the device since they have neither a trailer hitch nor wheels for easy movement. Furthermore, the Riley '332 patent requires the use of a pickup truck and the Steinfort '443 patent requires the use of some sort of lifting device, neither of which might be available to all users and in all locations and either of which could cause added expense for the owner. Additionally, the Kaplan '361, Riley '332, Miale, et al. '662 B1, and Steinfort '443 patent makes no provision for individually securing and supporting an animal's hoof for work that might need to be performed thereon, whereas the foot rests provided by the Pendleton '947 device are not adjustable, forcing the horse handler to correctly position the horse according to foot rest position instead of positioning the foot rest according to the horse's position. The Miale, et al. '662 B1 and Steinfort '443 devices are more useful for work on docile or immobile animals and would not easily lend themselves for use on feisty horses. Moreover, the Miale, et al. '662 B1 device requires multiple individuals to move the immobile animal onto the support sheet. The supporting frame of the Pendleton '947 device is not adjustable according to the girth of the animal; therefore, it would be more difficult to reach a smaller animal through the sides of the frame. Furthermore the procedure of looping a rope through the opening in the hoof restraint could be a tedious chore associated with the Walker '214 device and could result in a missing restraint at an inopportune time. Finally, the use of the bed of the pickup truck by the Riley '332 patent could lead to animal excrement in the truck bed, thereby leaving the owner an undesirable clean up job.

Therefore, a need exists for a new and improved stabilizer for shoeing a horse that can be used for providing increased safety with maximum animal accessibility to an individual performing close work on a horse or other large quadraped. In this regard, the present invention substantially fulfills this need. In this respect, the stabilizer for shoeing a horse according to the present invention substantially departs from the conventional concepts and designs of the prior art, and in doing so provides an apparatus primarily developed for the purpose of providing a mobile device that is used for securely holding horses for shoeing operations or veterinary procedures.

SUMMARY OF THE INVENTION

In view of the foregoing disadvantages inherent in the known types of specialty horse stabilizers now present in the prior art, the present invention provides an improved stabilizer for shoeing a horse, and overcomes the above-mentioned disadvantages and drawbacks of the prior art. As such, the general purpose of the present invention, which will be described subsequently in greater detail, is to provide a new and improved stabilizer for shoeing a horse which has all the advantages of the prior art mentioned heretofore and many novel features that result in a stabilizer for shoeing a horse which is not anticipated, rendered obvious, suggested, or even implied by the prior art, either alone or in any combination thereof.

To attain this, the present invention essentially comprises an open-backed rectangular frame with a pair of outboard-mounted wheel assemblies mounted on the sides and featuring a trailer hitch assembly, a pair of sliding side restraint bars, a pair of horizontal spines mounted on the restraint bars and formed with notches for the retention of restraining chains, an underbelly support harness, several restraint straps, and a moveable hoof positioner.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved stabilizer for shoeing a horse that has all of the advantages of the prior art specialty horse stabilizers and none of the disadvantages.

It is another object of the present invention to provide a new and improved stabilizer for shoeing a horse that may be easily and efficiently manufactured and marketed.

An even further object of the present invention is to provide a new and improved stabilizer for shoeing a horse that has a low cost of manufacture with regard to both materials and labor, and which accordingly is then susceptible of low prices of sale to the consuming public, thereby making such a stabilizer for shoeing a horse economically available to the buying public.

Still another object of the present invention is to provide a new stabilizer for shoeing a horse that provides in the apparatuses and methods of the prior art some of the advantages thereof, while simultaneously overcoming some of the disadvantages normally associated therewith.

Even still another object of the present invention is to provide a stabilizer for shoeing a horse for that allows a handler to effectively restrain a horse while performing close work such as shoeing operations or veterinary procedures. This provides the handler with a greater degree of safety while allowing the maximum degree of accessibility to the horse, allowing the work to proceed in a safe, easy, and efficient manner.

Yet another object of the present invention is to provide a stabilizer for shoeing a horse that provides a trailer-style configuration with outboard-mounted wheels and a trailer hitch assembly. This allows the unit to be easily transported to multiple locations around a ranch, racetrack, or related facility.

Even yet another object of the present invention is to provide a stabilizer for shoeing a horse that provides easily adjustable restraint bars. This allows the handler to easily accommodate varying breeds and sizes of horses with a minimum amount of exertion.

Lastly, it is an object of the present invention to provide a new and improved stabilizer for shoeing horses that provides an easily adjustable hoof positioner. This allows the handler to quickly and easily place the hoof positioner in the desired location for placement of the hoof, thereby preventing injury to either the horse or the individual providing care to the horse.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a left elevation view of the stabilizer for shoeing a horse of the present invention with inset FIG. 3a showing a close-up view of the horse's hoof on the leg positioner.

The same reference numerals refer to the same parts throughout the various figures.

DESCRIPTION OF THE PREFERRED EMBODIMENT

Referring now to the drawings, and particularly to FIGS. 1-5, a preferred embodiment of the stabilizer for shoeing a horse of the present invention is shown and generally designated by the reference numeral 10.

Figure 1:
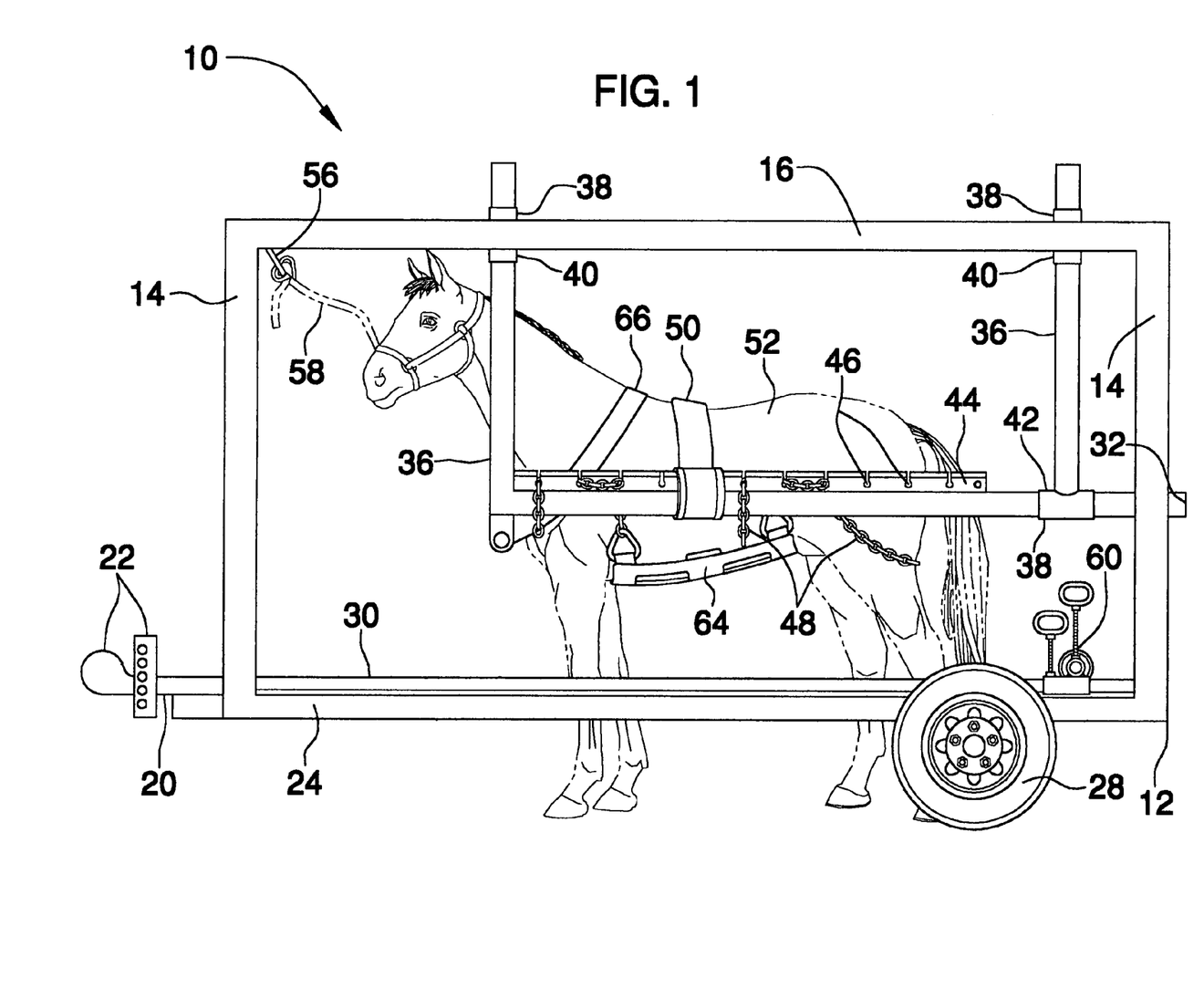
FIG. 1 is a right elevation view of the preferred embodiment of the stabilizer for shoeing a horse constructed in accordance with the principles of the present invention.

In FIG. 1, a new and improved stabilizer for shoeing a horse 10 of the present invention for securely holding horses during shoeing operations or veterinary procedures is illustrated and will be described. More particularly, the stabilizer for shoeing a horse 10 has an open rectangular frame 12 with uprights 14 at each of the four corners and horizontal supports 16 connecting the tops of the uprights 14 and the bottoms of the uprights 14 to form the frame 12. The rear of the frame 12 would not have a horizontal support 16, leaving an opening for ingress and egress of the horse. The uprights 14 and the horizontal supports 16 would be made of steel tubing and would form a frame 12 approximately 12 feet long×7 feet high×6 feet wide. The front of the frame 12 features an extended tongue 20 with a trailer hitch assembly 22, and the rear portions of the right and left lower horizontal supports, 24 and 26, rest upon outboard-mounted wheel assemblies 28, allowing the stabilizer 10 to be pulled behind a motorized vehicle. A hoof retaining assembly support bar 30 extends horizontally and slightly above the right lower horizontal support 24. A second hoof retaining assembly support bar 30 extends horizontally at the same height as the first above the left lower horizontal support 26 (also see FIGS. 2 and 6). A horse retention assembly would be formed from a pair of L-shaped retainer bars 32 suspended from a pair of horizontal retention supports 34 (see FIGS. 2 and 6) and a pair of vertical retention supports 36. The retainer bars 32 are connected to the retention supports, 34 and 36, with adjustable sliding mounts 38. These mounts 38 are T-shaped with hollow vertical and horizontal sections, 40 and 42, that allow the retainer bars 32 to be best positioned for the task at hand. A horizontal spine 44 with multiple notches 46 for chain 48 retention is affixed to each retainer bar 32. A back restraint strap 50 is also attached to each spine 44 and can be used in conjunction with the chains 48 for aid in restricting the movement of the horse 52. The upper front horizontal supports 54 (see FIG. 2) would feature a downwardly extending eyelet 56 to which the reins 58 could be affixed. Various set screw mechanisms 60 would be attached to the hoof retaining assembly support bars 30 for placement of the leg positioner 62 (see FIG. 2) in a desired location. A support harness 64 would be placed under the horse 52 and affixed to the spines 44 with a set of four chains 48. A neck restraint strap 66 can be attached to the front restraint bar 68 which is suspended below the retainer bars 32 from the front end of the bars 32.

Figure 2:
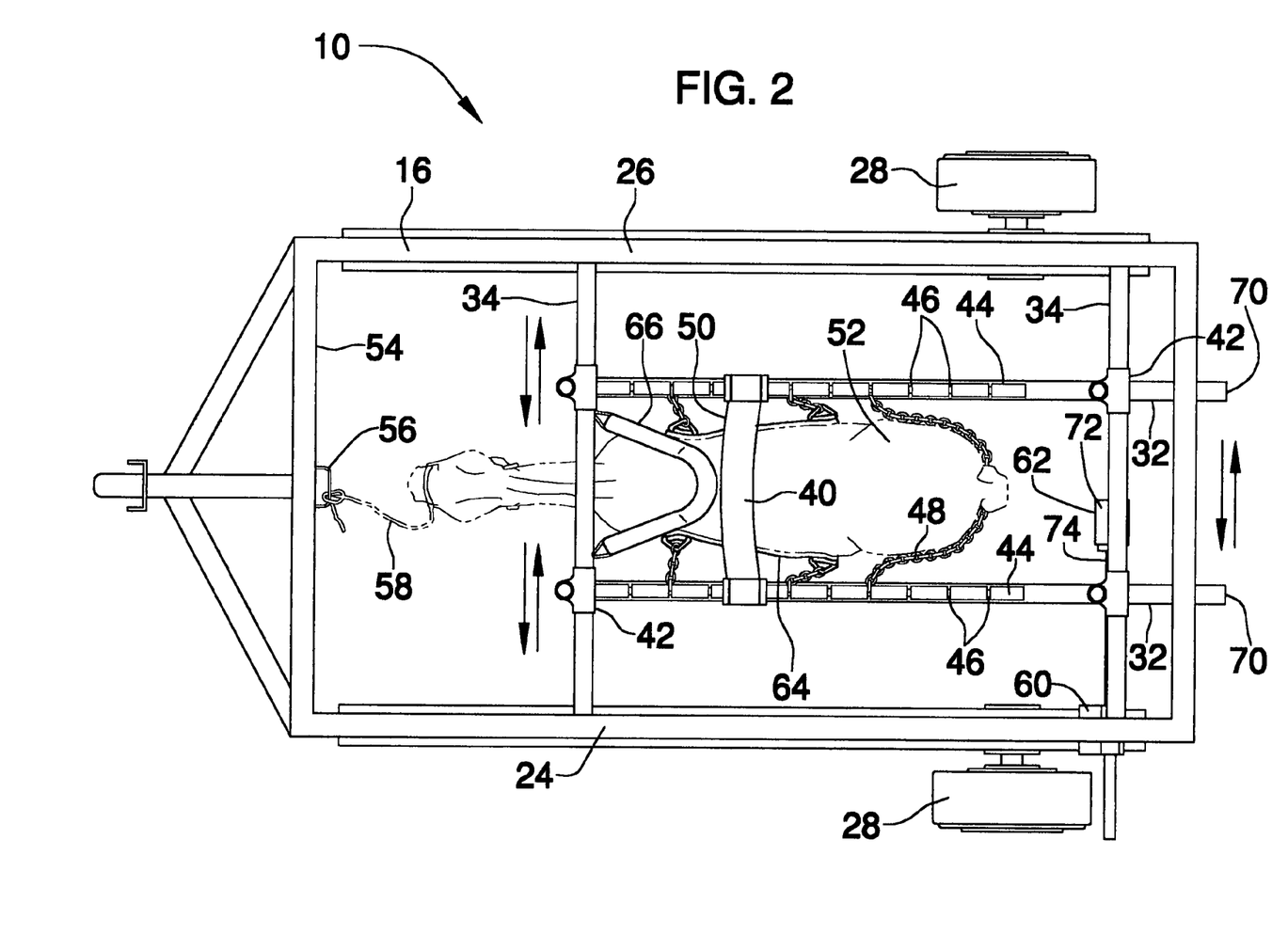
FIG. 2 is a top view of the stabilizer for shoeing a horse of the present invention with the side restraint bars in parallel alignment.

FIG. 2 shows a top view of the stabilizer for shoeing a horse 10. The open ends 70 of the retainer bars 32 are able to slide inwards toward the horse 52 to provide the maximum amount of lateral restraint. The adjustable neck restraint strap 66 and various chains 48 affixed to the support harness 64 would be used for maximum restraint capabilities. The leg positioner 62 consists of a cylindrical hoof rest 72 mounted on one end of a cylindrical support shaft 74 and inserted through a set screw mechanism 60 for easy movement along the hoof retaining assembly support bars 30. The leg positioner 62 can be removed from either bar 30 and placed on the opposing bar 30 to facilitate work on the desired side of the horse 52.

Figures 3, 3A:
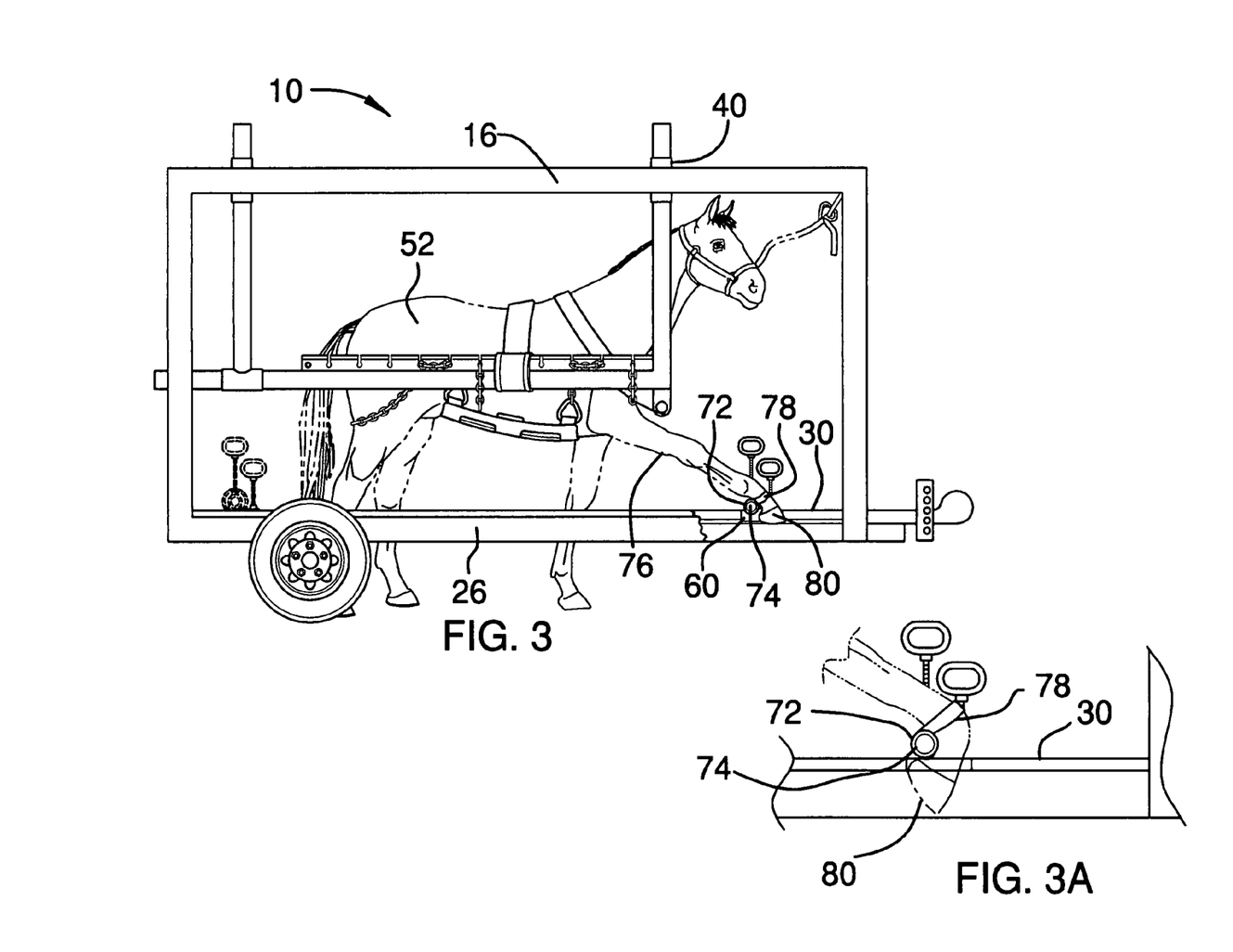
Figure 4:
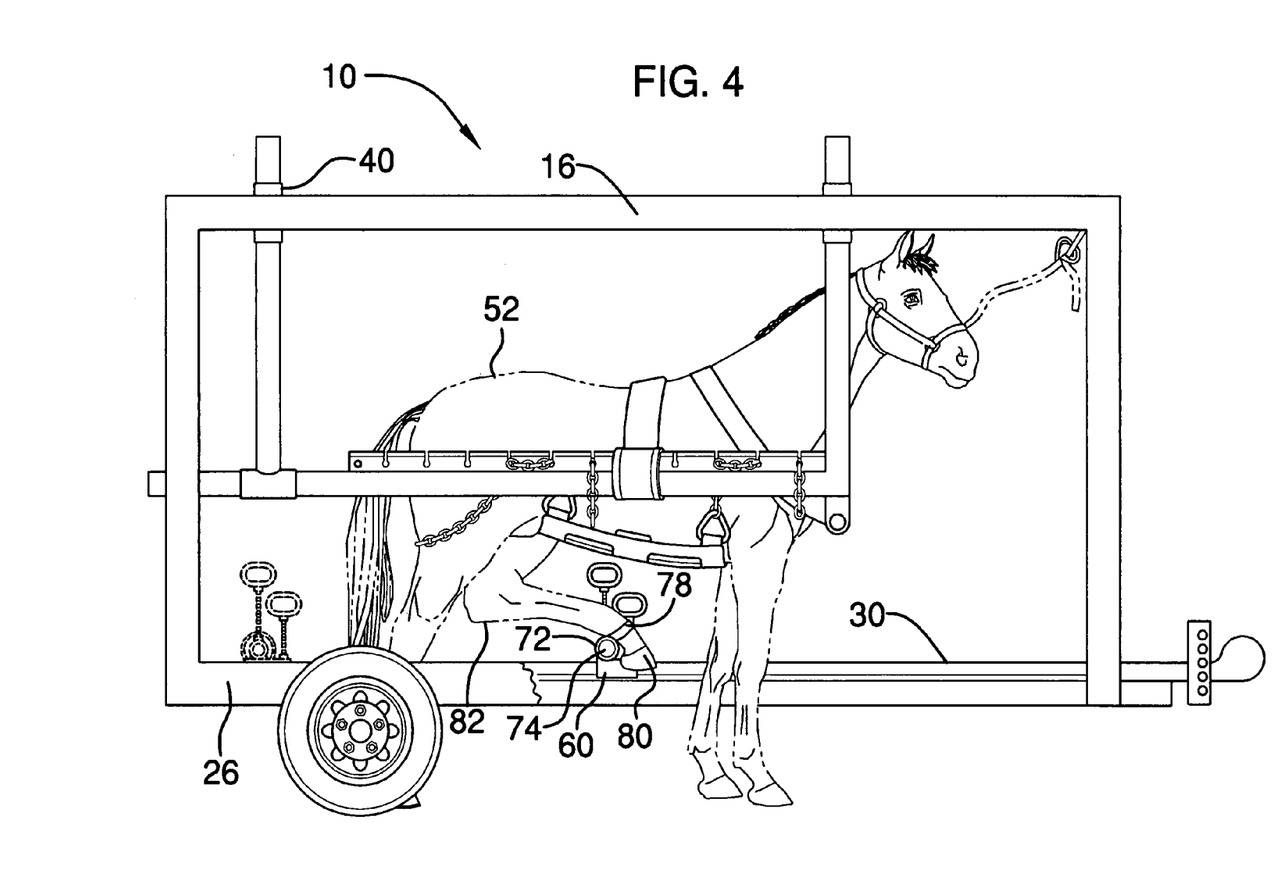
FIG. 4 is a left elevation view of the stabilizer for shoeing a horse of the present invention.
Figure 5:
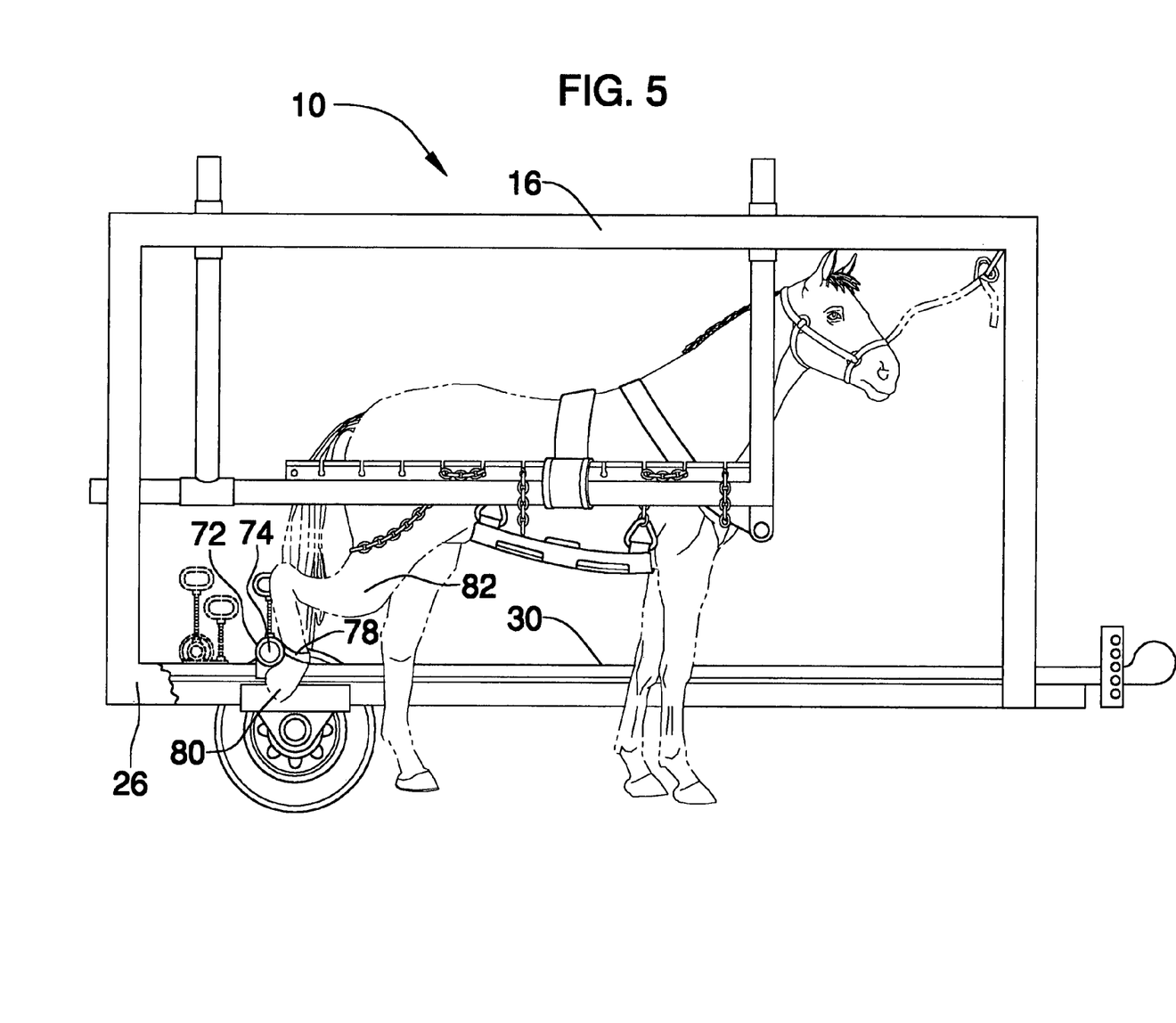
FIG. 5 is a left elevation view of the stabilizer for shoeing a horse of the present invention.

FIGS. 3-5 are all left elevation depictions of the stabilizer for shoeing a horse 10 that show the leg positioner 62 in various locations. FIG. 3 shows the leg positioner 62 placed for use on a forward leg 76 of the horse 52. A small loop 78 would be placed around the hoof 80 for added restraint. FIG. 4 shows an example wherein the leg positioner 62 is be placed for use with a rear leg 82 in the forward position. FIG. 5 indicates the placement of the leg positioner 48 for use with a rear leg 82 in the rearward position.

Figure 6:
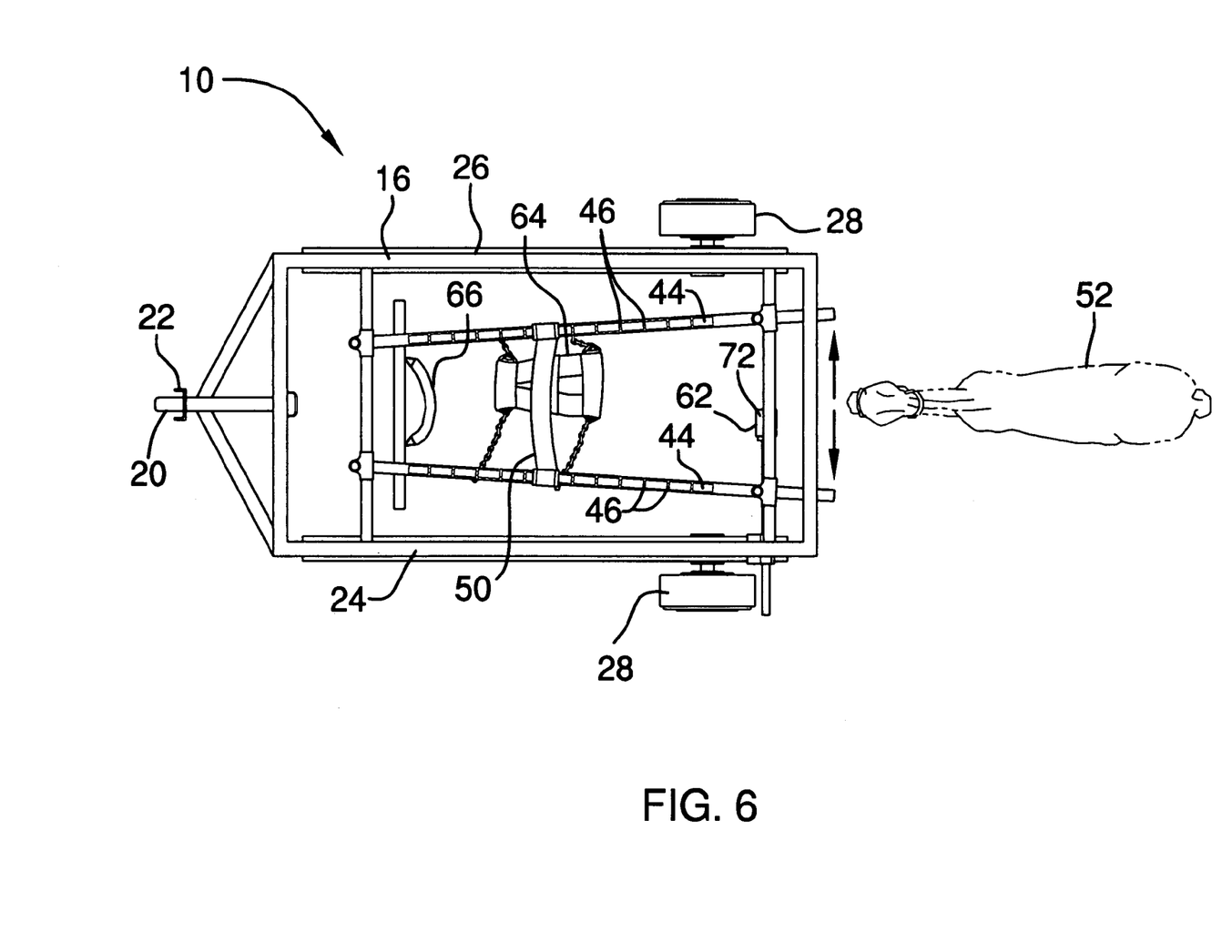
FIG. 6 is a top view of the stabilizer for shoeing a horse of the present invention with the side restraint bars in nonparallel alignment.

In use, it can now be understood from FIG. 6 that a horse 52 would be led into the frame 12 of the stabilizer for shoeing a horse 10. The handler would then restrain the horse 52 by sliding the retainer bars 32 inward, placing the support harness 64 beneath the belly of the horse 52 and affixing the connected chains 48 into notches 46 on the spines 44, adjusting and securing the neck strap 66 and the back strap 50, and adjusting and securing the remaining chains 48 by inserting them into notches 46 on the spines 44. Once the horse 52 was properly restrained, the handler would place the leg positioner 62 in the desired location, position the hoof 80 on the hoof rest 72, affix it with the loop 78, and administer the necessary care to the horse 52. Once the treatment was completed, the handler would remove all chains 48 and straps, 50 and 66, from the horse 52 and would then lead the horse 52 from the rear entry of the frame 12. The stabilizer for shoeing a horse 10 could be attached to a vehicle via the trailer hitch assembly 22 and driven to a new location.

While a preferred embodiment of the stabilizer for shoeing a horse has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, PVC, or a variety of wood may be used for the various components of the frame. And although securely holding horses for shoeing operations or veterinary procedures has been described, it should be appreciated that the stabilizer for shoeing a horse herein described is also suitable for use during treatment procedures for cattle or other large quadrupeds.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stabilizer for shoeing a horse comprising:
   a support frame;
   a plurality of retainer bars slideably and rotatably connected to said support frame;
   a plurality of mounting eyelets connected to said retainer bars and to said support frame;
   a plurality of outboard-mounted wheel assemblies connected to said support frame;
   a trailer hitch assembly connected to said support frame;
   a plurality of horizontal spines formed with a plurality of retention notches and connected to said plurality of retainer bars;
   a restraining strap connected to said plurality of retainer bars;
   a support harness connected to said retention notches of said plurality of horizontal spines;
   a plurality of restraining mechanisms connected to said harness, said plurality of mounting eyelets, and said retention notches of said plurality of horizontal spines; and
   a hoof positioner moveably connected to said support frame.

2. The stabilizer for shoeing a horse of claim 1 wherein said support frame further comprises:
   a plurality of vertical supports having a top end, a center, and a bottom end wherein said vertical supports are parallel and are placed in a rectangular configuration with a different said vertical support forming each corner of said rectangular configuration, said vertical supports being designated as front right, front left, rear right, and rear left vertical supports;
   a lower right horizontal support perpendicular to said front right vertical support and joining said bottom end of said front right vertical support to said bottom end of said rear right vertical support;
   a lower left horizontal support parallel to said lower right horizontal support and joining said bottom end of said front left vertical support to said bottom end of said rear left vertical support;
   a lower front horizontal support joining said bottom end of said front right vertical support to said bottom end of said front left vertical support;
   a right hoof retention assembly support bar perpendicularly connected between said front right and said rear right vertical supports wherein said right hoof retention assembly support bar is parallel to and slightly above said lower right horizontal support;
   a left hoof retention assembly support bar perpendicularly connected between said front left and said rear left vertical supports wherein said left hoof retention assembly support bar is parallel to and slightly above said lower left horizontal support;
   an upper right horizontal support perpendicular to said front right vertical support and joining said top end of said front right vertical support to said top end of said rear right vertical support;
   an upper left horizontal support parallel to said upper right horizontal support and joining said top end of said front left vertical support to said top end of said rear left vertical support;
   an upper front horizontal support joining said top end of said front right vertical support to said top end of said front left vertical support;
   an upper rear horizontal support joining said top end of said rear right vertical support to said top end of said rear left vertical support;
   a forward retainer bar support perpendicularly connected to said upper right and said upper left horizontal supports wherein said forward retainer bar support is parallel to said upper front horizontal support;
   a rear retainer bar support perpendicularly connected to said upper right and said upper left horizontal supports wherein said rear retainer bar support is parallel to said forward retainer bar support; and
   a right vertical retention support perpendicularly and slideably connected to said rear retainer bar support wherein said right vertical retention support extends downward from said rear retainer bar support; and
   a left vertical retention support perpendicularly and slideably connected to said rear retainer bar support wherein said left vertical retention support extends downward from said rear retainer bar support and is parallel to said right vertical retention support.

3. The stabilizer for shoeing a horse of claim 2 wherein said right and said left vertical retention supports are connected to said rear retainer bar support with hollow T-shaped connectors having a horizontal tube and a vertical tube wherein said rear retainer bar support passes through said horizontal tube and said right, or said left vertical retention support passes through said vertical tube.

4. The stabilizer for shoeing a horse of claim 2 wherein at least one of said plurality of mounting eyelets is connected to said upper front horizontal support.

5. The stabilizer for shoeing a horse of claim 2 wherein said hoof positioner further comprises:
   a cylindrical shaft having a first end and a second end;
   a cylindrical end block connected to said first end of said shaft;
   a pad covering said end block;
   a hoof retention loop connected to said end block; and
   a set screw mechanism connected near said second end of said shaft wherein said set screw mechanism slideably and removably connects said shaft to either said left or said right hoof retention assembly support bar.

6. The stabilizer for shoeing a horse of claim 2 wherein each of said plurality of retainer bars has an L-shape with a first end located on an elongated horizontal leg and a second end located on a shorter vertical leg and slideably connected on said horizontal leg to either said right or said left vertical retention support wherein said first end extends rearwardly beyond said right or said left vertical retention support and rotatably and perpendicularly connected on said second end to said forward retainer bar support wherein said first ends of two adjacent said retainer bars can be moved toward and apart from each other.

7. The stabilizer for shoeing a horse of claim 6 wherein said retainer bars are connected to said forward retainer bar support with hollow T-shaped connectors having a horizontal tube and a vertical tube wherein said forward retainer bar support passes through said horizontal tube and said second end of said retainer bar passes through said vertical tube.

8. The stabilizer for shoeing a horse of claim 6 wherein said retainer bars are connected to said right or said left vertical retention support with a hollow tubular connector wherein said horizontal leg of said retainer bar passes through said connector.

9. The stabilizer for shoeing a horse of claim 6 wherein each said horizontal spine is rectangular with an elongated top formed with a plurality of restraining notches, an elongated bottom, a right side, and a left side and wherein said elongated bottom is connected along said horizontal leg of one of said retainer bars.

10. The stabilizer for shoeing a horse of claim 6 further comprising:
a forward restraint suspended below said right and said left retainer bars wherein said forward restraint is parallel to said forward retainer bar support; and
an adjustable neck restraint strap having a first end, a center portion, and a second end and removably connected on said first and said second ends to said forward restraint wherein said neck restraint strap could be placed around a horse's neck.

11. The stabilizer for shoeing a horse of claim 10 wherein said retainer bars and said forward restraint are formed of cylindrical tubing.

12. The stabilizer for shoeing a horse of claim 1 wherein said support harness is formed to fit the underbelly of a horse.

13. The stabilizer for shoeing a horse of claim 1 wherein said restraining mechanisms are chains.

14. A stabilizer for shoeing a horse comprising:
a plurality of vertical supports having a top end, a center, and a bottom end wherein said vertical supports are parallel and are placed in a rectangular configuration with a different said vertical support forming each corner of said rectangular configuration, said vertical supports being designated as front right, front left, rear right, and rear left vertical supports;
a lower right horizontal support perpendicular to said front right vertical support and joining said bottom end of said front right vertical support to said bottom end of said rear right vertical support;
a lower left horizontal support parallel to said lower right horizontal support and joining said bottom end of said front left vertical support to said bottom end of said rear left vertical support;
a lower front horizontal support joining said bottom end of said front right vertical support to said bottom end of said front left vertical support;
a right hoof retention assembly support bar perpendicularly connected between said front right and said rear right vertical supports wherein said right hoof retention assembly support bar is parallel to and slightly above said lower right horizontal support;
a left hoof retention assembly support bar perpendicularly connected between said front left and said rear left vertical supports wherein said left hoof retention assembly support bar is parallel to and slightly above said lower left horizontal support;
an upper right horizontal support perpendicular to said front right vertical support and joining said top end of said front right vertical support to said top end of said rear right vertical support;
an upper left horizontal support parallel to said upper right horizontal support and joining said top end of said front left vertical support to said top end of said rear left vertical support;
an upper front horizontal support joining said top end of said front right vertical support to said top end of said front left vertical support;
an upper rear horizontal support joining said top end of said rear right vertical support to said top end of said rear left vertical support;
a forward retainer bar support perpendicularly connected to said upper right and said upper left horizontal supports wherein said forward retainer bar support is parallel to said upper front horizontal support;
a rear retainer bar support perpendicularly connected to said upper right and said upper left horizontal supports wherein said rear retainer bar support is parallel to said forward retainer bar support;
a right retainer bar having an F-shape with a first horizontal leg parallel to said lower right horizontal support, a top vertical leg extending upward from said horizontal leg and rotatably connected to said forward retainer bar support, and a middle vertical leg slideably connected to and extending upward from said horizontal leg and rotatably connected to said rear retainer bar support;
a left retainer bar having an F-shape with a first horizontal leg parallel to said lower left horizontal support, a top vertical leg extending upward from said horizontal leg and rotatably connected to said forward retainer bar support, and a middle vertical leg slideably connected to and extending upward from said horizontal leg and rotatably connected to said rear retainer bar support;
a forward restraint suspended below said right and said left retainer bars wherein said forward restraint is parallel to said forward retainer bar support; and
a plurality of mounting eyelets connected to said right retainer bar, said left retainer bar, and said upper front horizontal support;
a plurality of outboard-mounted wheel assemblies connected to said lower right and said lower left horizontal supports;
a trailer hitch assembly connected to said lower front horizontal support;
a right horizontal spine having an elongated top formed with a plurality of retention notches, an elongated bottom, a right side, and a left side and connected on said bottom to said right retainer bar;
a left horizontal spine having an elongated top formed with a plurality of retention notches, an elongated bottom, a right side, and a left side and connected on said bottom to said left retainer bar;
a restraining strap having a first end connected to said right retainer bar and a second end connected to said left retainer bar;
a support harness connected to said plurality of retention notches of said left and said right horizontal spines;
a plurality of restraining mechanisms connected to said harness, said plurality of mounting eyelets, and said plurality of retention notches of said right and said left horizontal spines; and
a hoof positioner removeably connected to either said right or said left hoof retention assembly support bar.

15. The stabilizer for shoeing a horse of claim 14 further comprising:
a plurality of hollow T-shaped connectors having a horizontal tube and a vertical tube and connecting said forward retainer bar support to said left and said right retainer bars and said rear retainer bar support to said left and said right retainer bars wherein said forward and said rear retainer bar supports pass through said horizontal tubes of said plurality of connectors and said left and said right retainer bars pass through said vertical tubes of said plurality of connectors.

16. The stabilizer for shoeing a horse of claim 14 wherein said hoof positioner further comprises:
a cylindrical shaft having a first end and a second end;
a cylindrical end block connected to said first end of said shaft;
a pad covering said end block;
a hoof retention loop connected to said end block; and
a set screw mechanism connected near said second end of said shaft wherein said set screw mechanism slideably and removably connects said shaft to either said right or said left hoof retention assembly support bar.

17. The stabilizer for shoeing a horse of claim 14 wherein said forward restraint and said right and said left retainer bars are comprised of cylindrical tubing.

18. The stabilizer for shoeing a horse of claim 14 wherein said middle vertical legs of said right and said left retainer bars are connected to said rear retainer bar support with a hollow tubular connector wherein said horizontal leg of said right or said left retainer bar passes through said connector.

19. The stabilizer for shoeing a horse of claim 14 wherein said support harness is formed to fit the underbelly of a horse.

20. The stabilizer for shoeing a horse of claim 14 wherein said restraining mechanisms are chains.

* * * * *